United States Patent [19]

Korionoff, Jr. et al.

[11] 4,354,803
[45] Oct. 19, 1982

[54] SAIL POWER DEVICE

[76] Inventors: Victor S. Korionoff, Jr., 83 Silencio St., Santol, Quezon City; Miguel A. Magsaysay, 1575 Cypress St., Dasmariñas Village, Makati, Metro Manila, both of Philippines

[21] Appl. No.: 868,389

[22] Filed: Jan. 9, 1978

[51] Int. Cl.³ .............................................. F03D 5/06
[52] U.S. Cl. ........................................ 416/81; 416/240
[58] Field of Search ................. 416/79, 81, 197 A, 83, 416/240 A, 64, 65, 66; 417/334, 335, 336

[56] References Cited

U.S. PATENT DOCUMENTS

| | | | |
|---|---|---|---|
| 237,851 | 2/1881 | Foskett | 416/83 |
| 387,938 | 8/1888 | Whinery | 416/83 |
| 474,839 | 5/1892 | Lamphear | 416/83 |
| 535,504 | 3/1895 | Milliken | 416/83 |
| 588,060 | 8/1897 | Fruit | 416/197 |
| 1,246,484 | 11/1917 | Souvielle | 416/197 |
| 4,024,409 | 5/1977 | Payne | 416/81 |

FOREIGN PATENT DOCUMENTS 883429  7/1953  Fed. Rep. of Germany .... 416/DIG. 4

Primary Examiner—Everette A. Powell, Jr.
Assistant Examiner—A. N. Trausch, III

[57] ABSTRACT

This sail power device consists of a sail having a minimally stretchable material along the peripheral sides thereof, a rigid means disposed along the horizontal axis of said sail and connected to the minimally stretchable material, means disposed at the opposed horizontal end portions of said sail to bend sail end portions in opposite direction, means for supporting the upper end of said sail, and a spring-biased means connected to the lower end of said sail.

3 Claims, 2 Drawing Figures

SAIL POWER DEVICE

This invention relates generally to wind operated devices or windmills and more particularly to a sail device for converting wind power directly into vigorous oscillating motion capable of operating pumps or the like.

Heretofore, wind operated devices or windmills rotate by the action of the wind and this rotary motion has to be converted into reciprocating motion if reciprocating pumps or the like are to be operated. Present windmills also require high velocities and have to be supported by strong and elaborate structures. Said structure are usually tall to take advantage of the high wind velocities prevalent at high elevation. Due to the above requirements of present conventional windmills, the cost thereof is still rather high and not within the reach of the masses.

In view of the above drawbacks noted in the present windmills, it is therefore the object of this invention to provide a novel wind operated device which immediately converts the force of the wind into vigorous oscillating force.

Another object is to provide a sail power device which is very simple and do not also require elaborate structures to support or mount it.

A further object is to provide a sail power device parts of which are very simple, easy to fabricate, to assemble and to install.

An object also of this invention is to provide a sail power device which require a very low capital investment compared to the present conventional windmills.

All these objects, as well as, the advantages of this power device will be easily comprehended after studying the following detailed description of the appended drawings, wherein.

Figures 1, 2:
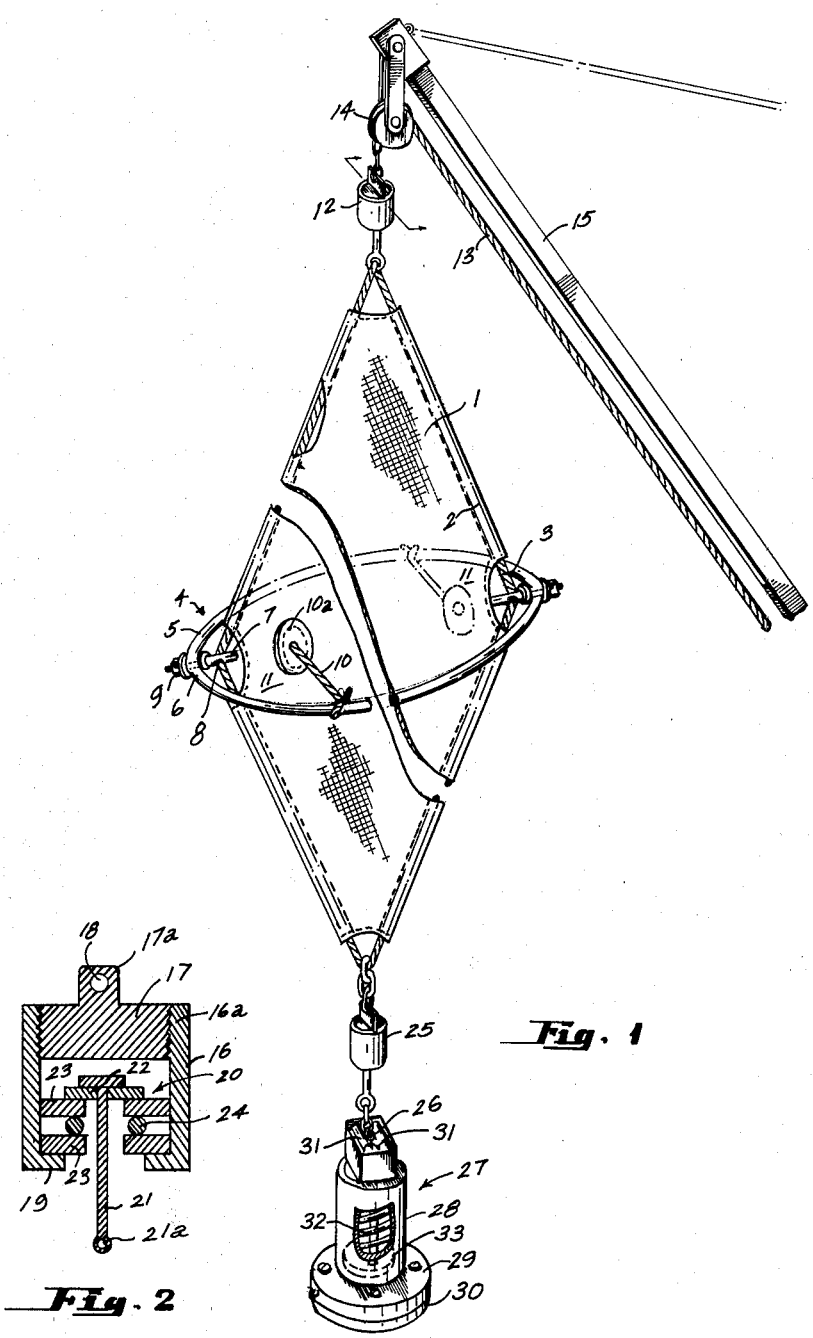
FIG. 1 is a pictorial view of this sail power device.
FIG. 2 is a cross-sectional view of the bearing swivel used in supporting the sail assembly.

Referring now to the drawings, this sail power device has a sail assembly which includes a sail 1 made of DACRON, nylon, canvass or any suitable material, preferably of generally diamond shape. Threaded through the reinforced pipings 2 at the peripheral sides of the sail is the minimally stretchable material, such as a steel cable 3 which follows the general shape of the sail. This minimally stretchable material or steel cable is stretched along the widest horizontal portion by a cable stretcher means 4 which consists of a generally elliptical rigid member 5 having a slot at each of the opposed portions 6 along the major axis thereof, through which a corresponding bolt 7 is inserted. Each of the bolts 7 has a slot 8 through which the steel cable is threaded. Each of the bolts has a threaded outer portion to which are screwed the retainer nuts 9.

Disposed on the opposed horizontal corner portions of the sail, are the identical sail flexing or bending means, each of which consists of a rope or strap 10, one end of which is secured to a reinforced or patched portion 10a and the other end of which is secured or tied to the opposite sides of the cable stretcher, such that the sail would have oppositely cambered or curved horizontal corners portions 11. With this construction, the sail assembly is free to rotate along its vertical axis and at the same time move away from the vertical plane thereof when the sail catches the wind.

The upper corner of the sail cable is connected to a bearing swivel 12 which in turn is connected to a hoisting cable 13 trained on the sheave pulley 14 secured to the top of a support pole 15. As shown in FIG. 2, the bearing swivel consist of a short tubular portion 16 with an internally threaded upper portion 16a to which the cap 17 is screwed. The cap 17 has an ear 17a with slot 18 to which the hoisting cable is connected. At bottom end of the tubular portion is an integral annular flange 19 on which the bearing assembly 20 is seated. Said bearing assembly has a downwardly extending centrally disposed rod 21 with an eye 21a and a top plate 22 which rests on the upper of the identical rings 23 which sandwich the ball bearings 24. The bottom end of the sail support pole is anchored in any suitable conventional manner and the upper end thereof guyed.

The bottom corner of the cable is connected to a similar bearing swivel 25 which in turn is adopted to are connected to the cable 26 of an exemplary adapter assembly 27. This adapter assembly which is optional, has a tubular member 28 with an integral bottom flange 29 having several bolt holes for connection to the top of a pitcher pump 30 or any vertically reciprocating device. At the upper portion of said tubular member is rotatively mounted a pair of grooved rollers 31 which guide the adapted cable (optional) 26. Disposed within the tubular member is a compression spring 32 (optional) which is compressed by a plate 33 secured to the adapter cable when the sail assembly moves away from its vertical plane.

While it is not shown in the drawings, the hoisting cable is secured to any suitable conventional anchoring means and may also be provided with a turn buckle if desired.

Various modification of this invention may be made by those skilled in the art after going over the above disclosure without departing from the essence of the invention as defined in the appended claims.

We claim:

1. A sail power device the upper end of which is adapted to be secured to a rigid support and the lower end of which is adapted to be secured to a reciprocating work load, said sail power device comprising a diamond shaped sail disposed such that the upper and lower corners thereof are vertically aligned, while the other two corners thereof are horizontally aligned, a cable means secured to the peripheral sides of said sail, a sail stretcher means to which the two horizontally aligned corners of said sail are attached, and an upper and a lower bearing swivel means connected to the upper and lower corners of said cable means.

2. A sail power device as defined in claim 1 wherein the lower bearing swivel means is connected to a compression spring biased adapter means.

3. A sail power device as defined in claim 1 wherein said sail stretcher is of generally elliptical shape.

* * * * *